United States Patent [19]
Gustafsson et al.

[11] 3,973,594
[45] Aug. 10, 1976

[54] MIXING VALVE
[75] Inventors: John Harry Gustafsson, Bromolla; Tord Egron Henry Froberg, Kristianstad, both of Sweden
[73] Assignee: IFO AB, Bromolla, Sweden
[22] Filed: Dec. 30, 1974
[21] Appl. No.: 537,205

[30] Foreign Application Priority Data
Jan. 15, 1974  Sweden .............................. 7400480

[52] U.S. Cl. ............................. 137/637; 137/606
[51] Int. Cl.² ...................................... F16K 19/00
[58] Field of Search ................. 137/606, 637; 4/192

[56] References Cited
UNITED STATES PATENTS
| | | | |
|---|---|---|---|
| 641,828 | 1/1900 | Brophy | 4/192 UX |
| 1,216,940 | 2/1917 | Burney | 137/606 |
| 1,258,262 | 3/1918 | Shapley | 137/637 |
| 3,395,734 | 8/1968 | Spencer | 137/637 |
| 3,903,926 | 9/1975 | Constantinesco | 137/637 |

*Primary Examiner*—Robert G. Nilson
*Attorney, Agent, or Firm*—Leydig, Voit, Osann, Mayer & Holt, Ltd.

[57] ABSTRACT

A mixing valve for hot and cold water has two control levers for single hand operation each governing the position of a valve plug. The one lever controls the flow rate of the hot water and the other the flow rate of the cold water. The temperature of the mixed water is regulated by change of the relative positions of the levers and its flow rate is controlled by movement of the levers in unison. Such movement will leave the temperature unaffected because the levers actuate the plugs over cam means and the control surfaces between those means and the plugs yield a logarithmic relationship between the flow area at each plug and the corresponding lever movement.

1 Claim, 5 Drawing Figures

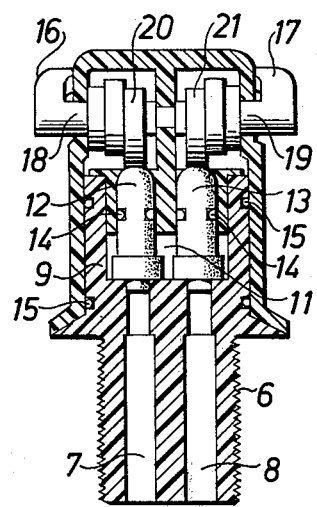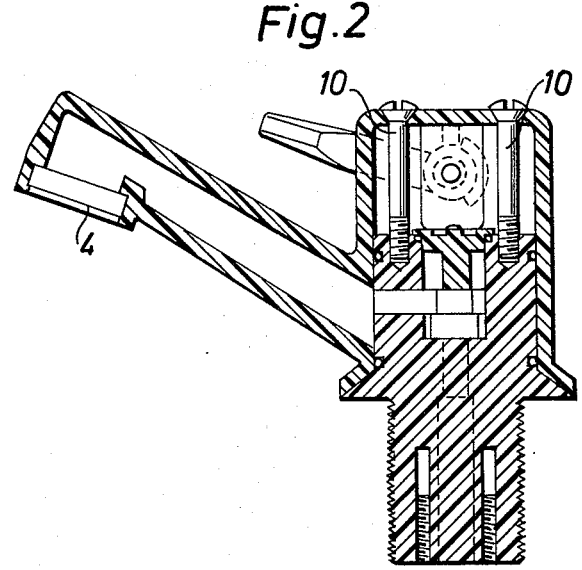

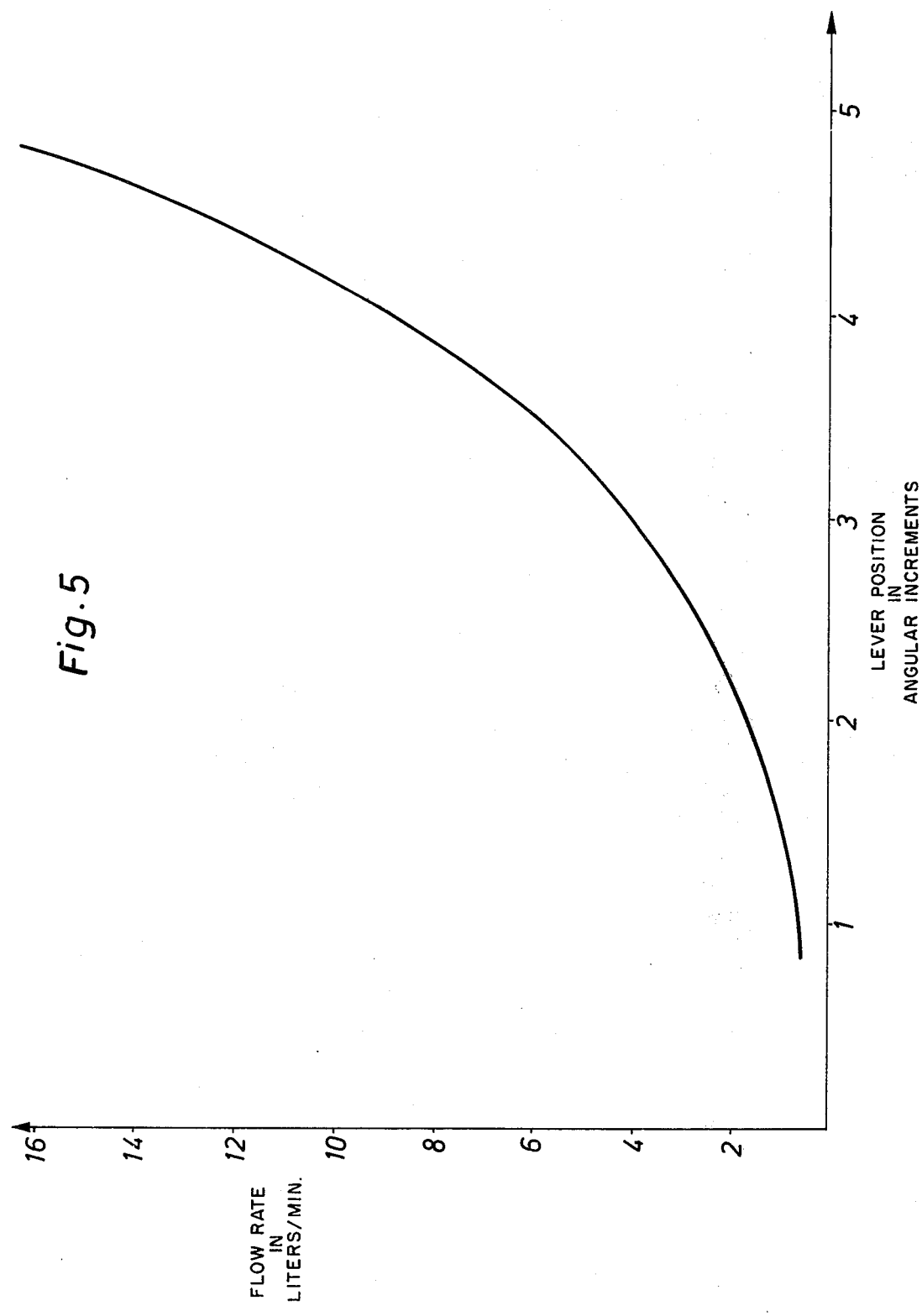

MIXING VALVE

The present invention relates to a mixing valve for hot and cold water, comprising a valve housing having connection means for water supply pipes and an outlet for the mixed water, the flow and temperature of which are controlled with the aid of the valve. It also comprises two substantially lever-shaped control members which are swingable around approximately horizontal axes. The free ends of those members are located close together so that both valves may be operated by a single hand.

U.S. Pat. No. 1,475,051 discloses a mixing valve of the general type above described. The control shafts of the levers carry pinions engaging racks which in turn support the movable valve plugs. In a valve of that kind there is a very substantial risk that the rack-and-pinion mechanism is put out of service due to lime deposits thereon. Another very substantial disadvantage is that when the control levers have been set corresponding to a certain flow and a certain temperature of the mixed water and it is desired to change the output flow, such a change will also affect the temperature when the two levers are moved in unison.

The main object of the invention is to provide a mixing valve in which the shortcomings above referred to have been eliminated. According to the characteristics of the invention the shafts of the control levers have cam means acting directly upon the valve plugs, the contact surfaces between said cam means and the valve plugs being shaped so that when the levers are moved in the same direction through equal angular increments there is a logarithmic relationship between the effective cross-sectional area of the flow orifice at each valve unit and the corresponding lever movement.

Two embodiments of the invention will now be described with reference to the accompanying drawing, in which:

FIGS. 2 and 3 are elevational sections through the valve of FIG. 1, the two sectional planes being perpendicular to each other;

Figure 1:
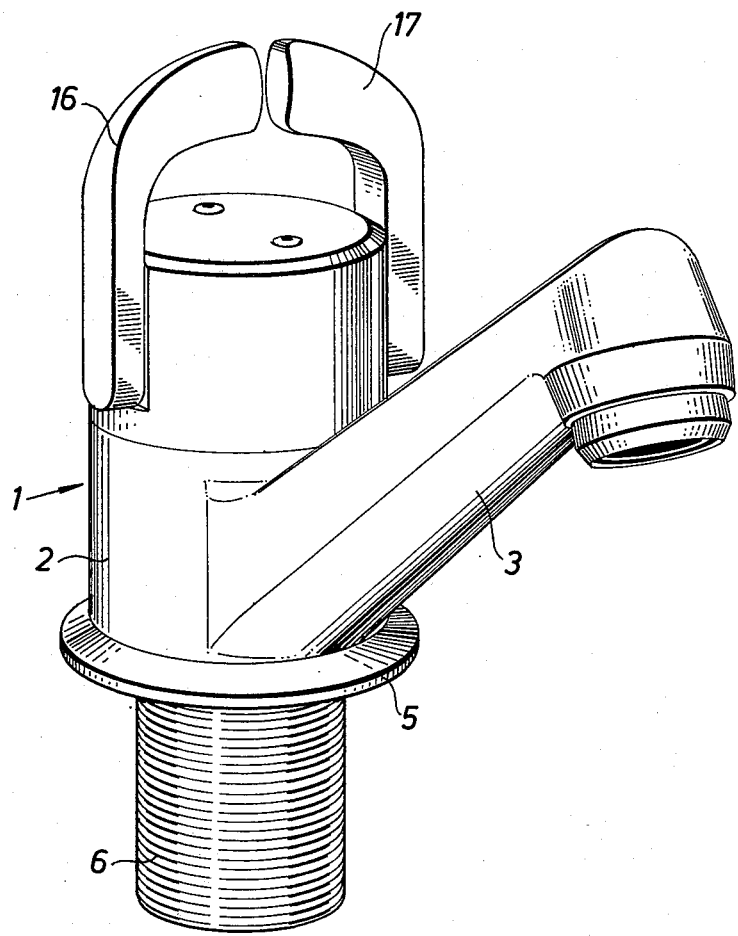
FIG. 1 is a perspective view of a valve according to a first embodiment.
Figure 4:
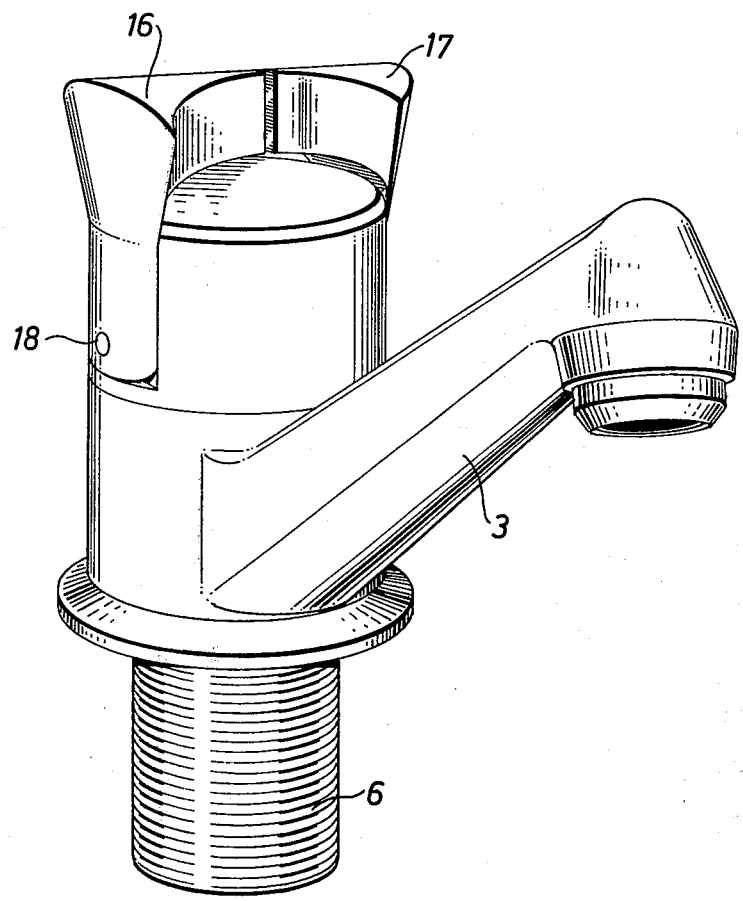

FIG. 4 corresponds to FIG. 1 but illustrates a second embodiment; and

FIG. 5 illustrates the operation characteristic of a valve according to the invention.

The valve shown on the drawing and generally designated 1 has a substantially cylindrical housing 2 from the bottom portion of which projects an obliquely forwards and upwards directed outlet spout 3. At the outlet end thereof there is a strainer screen 4. The foot of the housing forms a mounting flange 5 and is secured to an externally threaded connecting pipe 6. As does most clearly appear from FIG. 3, the latter contains two parallel supply passages 7 and 8 for hot and cold water, respectively. According to the embodiments of the invention here shown the valve housing can be looked upon as composed by two main portions, namely on the one hand the directly visible parts, the cylindrical casing 2, the spout 3 and the flange 5 and, on the other, an internal base the top 9 of which is surrounded by the casing and the bottom portion of which constitutes pipe 6. The two main portions are held together by bolts 10. Hot and cold water passages 7 and 8 open in a mixing chamber 11 at the top of the base of the housing. Their corresponding inlet orifices form valve seats which in the completely closed condition of the valve are covered by matching bottom surfaces of two substantially cylindrical valve plugs 12 and 13. As appears from the drawing, those plugs are guided in cylindrical passages in the base and surrounded by sealing rings 14. Numeral 15 refers to sealing rings mounted between base 9 and external casing 2.

FIG. 3 illustrates that the pressure of the water in passages 7 and 8 tends to force valve plugs 12 and 13 upwards, i.e. towards their open positions. However, each valve plug can be retained in a partially or completely closed position by means of a control lever 16 and 17 the horizontal pivots, or shafts, 18 and 19 of which are mounted in opposite coaxial relationship and each carrying an excenter, or cam curve, 20 and 21, respectively. Those cam curves cooperate with the top surfaces of valve plugs 12, 13 and the contact surfaces between those parts are shaped so that there exists a logarithmic relationship between on the one hand the effective cross-sectional area defined between either of the plugs and its valve seat and, on the other, the corresponding lever position. This has been illustrated diagrammatically in FIG. 5 the curve of which indicates the water flow rate in liters per minute which varies directly with the height of the flow cross-sectional area expressed in millimeters versus the angular lever position expressed in increments 1 through 5 each of which may be on the order of about 15°. FIG. 1 shows the levers 16, 17 in the vertical or zero angular position and FIG. 3 shows the levers rotated forward about 75°. As indicated on the graph of FIG. 5 the maximum flow rate through each passage 7, 8 occurs slightly before levers 16, 17 reach position 5 since the valve plugs 12, 13 are then moved sufficiently off their respective seats that the water flow is dependent on the free area of the seats at the upper end of their respective passages 7 and 8. The practical consequence of this design is that the ratio between the flows obtained when the hot and cold water control rods are set in arbitrary positions remains constant along all of the curve or, put in other words, a desired regulation of the flow does not yield an undesired temperature change. If the flow characteristic were instead linear that ratio would successively decrease for increasing flow rates.

It appears from the drawings and from the description above that the objects of the invention above mentioned have been realized. Thus, a movement of the valve plugs in the direction corresponding to decreased flow rates is effected in the way that the plugs are actuated upon by cam means which are preferably mounted directly on or integral with the control levers. The contact surfaces between the plug tops and the cams are shaped so that the control movement becomes self-braking or irreversable. When the plugs are to be moved in the opposite direction corresponding to increased flow rates they are not positively controlled in a mechanical sense since the water pressure tends to displace them in that direction. It is, however, sometimes feasible to rely on springs amplifying that force. It should be observed that according to all embodiments of the invention it is superfluous mechanically to interconnect the control means and the valve plugs which highly simplifies the manufacture of the various components of the valve and accordingly reduces the costs for their manufacture as well as the costs for the assembly of the valve. It should be emphasized that the term "valve plugs" as used in this patent should be interpreted in a functional rather than a verbal sense. Thus, the plugs do not have to be cylindrical or of circular cross-section but can be constituted by any suitable means, e.g. valve flaps.

The valve shown in FIG. 4 is operationally identical to the valve 1 and parts corresponding to those previously described have been given the same reference numerals. The only difference between the valves of FIGS. 1 and 4 is in the external appearance and thus in the way the control levers 16, 17 are juxtaposed for single-hand operation.

What is claimed is:

1. In a hot and cold water mixing valve including a valve housing, a single outlet spout formed in said housing, means for connecting said spout to hot and cold water supply pipes, said means including separate hot and cold water valve seats normally closed by separate hot and cold water valve plugs, a pair of control levers positioned for single-hand operation and pivoted on said housing, and a pair of cam means, operated by pivoting respective ones of said levers, for moving respective ones of said plugs so as to open said valve seats, the improvement comprising, shaping contact surfaces of said cams and said plugs which move said plugs so that pivoting of each lever changes the effective flow rate through the associated valve seat from substantially zero upward to maximum in a logarithmic relationship whereby the ratio of hot to cold water flow, once set by relatively adjusting said levers, remains the same as both levers are thereafter simultaneously moved in the same direction through equal angular increments to adjust the rate of total water flow.

* * * * *